United States Patent [19]

Ishitobi et al.

[11] Patent Number: 4,500,867
[45] Date of Patent: Feb. 19, 1985

[54] JOYSTICK CONTROLLER USING MAGNETOSENSITIVE ELEMENTS WITH BIAS MAGNETS

[75] Inventors: Yoshimitsu Ishitobi; Kouhei Fujii; Fumio Nakatsuji, all of Shiga, Japan

[73] Assignee: NEC Kansai, Ltd., Otsu, Japan

[21] Appl. No.: 619,719

[22] Filed: Jun. 11, 1984

Related U.S. Application Data

[63] Continuation-in-part of Ser. No. 420,745, Sep. 21, 1982.

[30] Foreign Application Priority Data

Jan. 13, 1982 [JP] Japan ................................ 57-4438
May 31, 1982 [JP] Japan ........................... 57-81537[U]

[51] Int. Cl.³ .................. H01C 9/00; H01C 9/02; H01C 10/16
[52] U.S. Cl. ................. 338/128; 338/32 R; 73/471; 200/6 A; 273/148 B
[58] Field of Search ............ 338/128, 90, 32 R; 200/6 A; 74/471 XY, 473 P, 501 M; 273/148 B, DIG. 28; 401/90, 138, 144

[56] References Cited

U.S. PATENT DOCUMENTS 3,331,972 7/1967 Moeller.
3,372,359 3/1968 Wilson .............................. 338/128
3,760,320 9/1973 Oka et al. ........................ 338/128
3,939,451 2/1976 Kasahima ....................... 338/128
3,942,148 3/1976 Nishioka ......................... 338/128

FOREIGN PATENT DOCUMENTS 463581 7/1928 Fed. Rep. of Germany ..... 200/6 A

Primary Examiner—Roy N. Envall, Jr.
Assistant Examiner—C. N. Sears
Attorney, Agent, or Firm—W. G. Fasse; D. H. Kane, Jr.

[57] ABSTRACT

A joystick controller of the electrically non-contact type is provided with a pair of magnetosensitive elements having a magnetresistive effect. The magnetosensitive elements are placed fixedly on a stator member in a given relation at right angles to detect the rotary motion of a permanent magnet embedded in a rotor member movably supported by the stator member. Each of the magnetosensitive elements is supplied by a constant bias magnetic field generated by added magnets on the stator member to improve the sensing characteristics of the controller. In addition, a spring sheet member is assembled between surfaces of the rotor and stator members to afford appropriate feeling and handling for operation of the lever.

7 Claims, 17 Drawing Figures

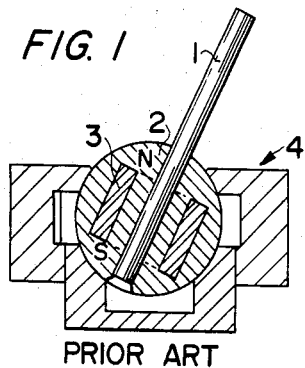
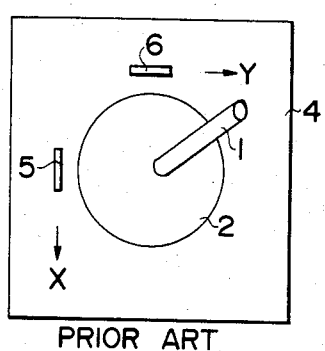
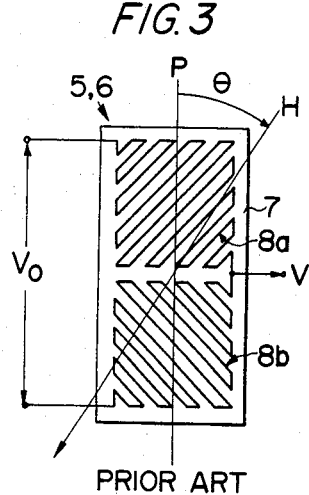
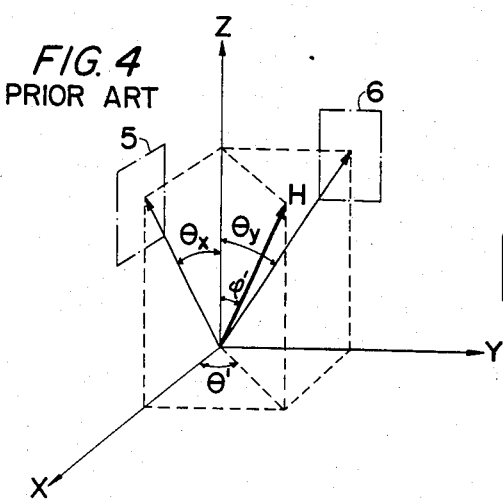
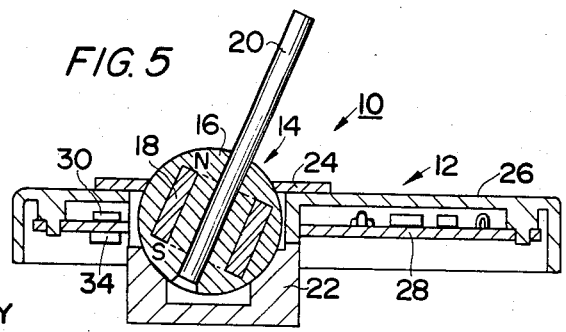
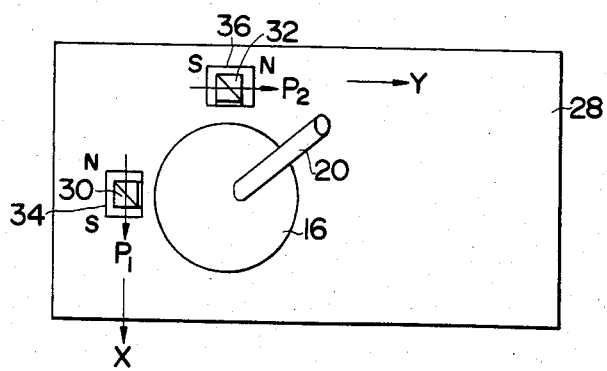
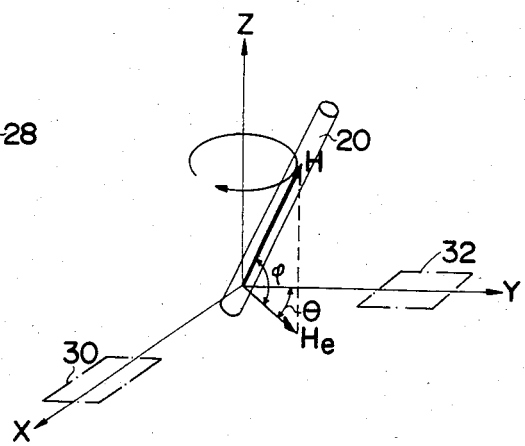

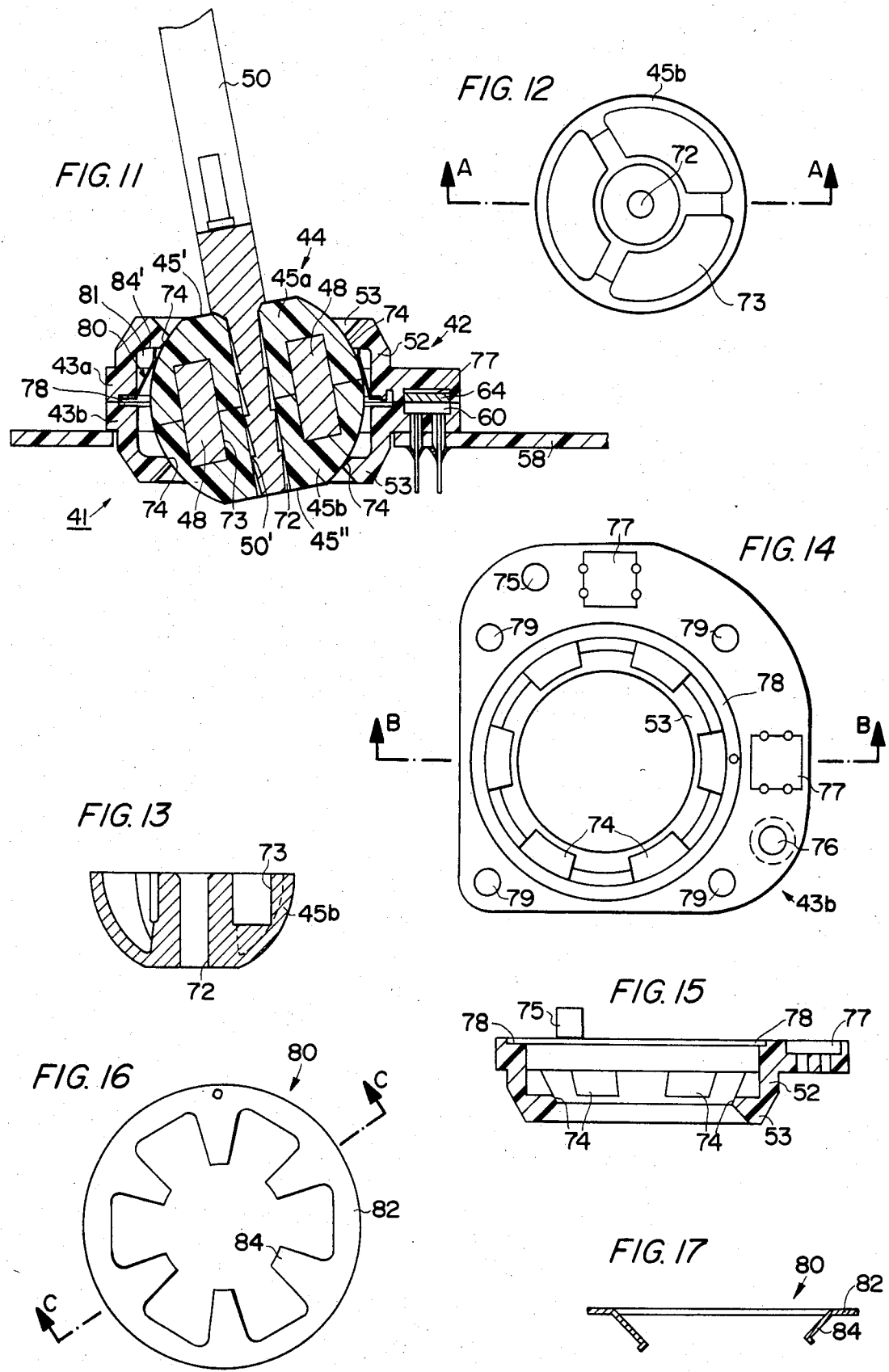

JOYSTICK CONTROLLER USING MAGNETOSENSITIVE ELEMENTS WITH BIAS MAGNETS

CROSS-REFERENCE TO RELATED APPLICATION

The present application is a continuation-in-part application of our copending U.S. Ser. No. 420,745, filed on Sept. 21, 1982.

FIELD OF THE INVENTION

This invention relates to a non-contact controller for detecting rotary motion of a sphere, and particularly to a joystick controller using a pair of magnetosensitive elements for detecting angular positions of the spherical rotor member and accompanying joystick control lever.

Joystick controller mechanical-electrical transducers generally detect angles of operation of the joystick lever by utilizing electric outputs obtained in the form of X-Y or orthogonally resolved components. Such electrical output signals correspond to the inclination of the operating lever and the corresponding magnitude of rotary movement of the rotating body along two orthogonal coordinate axes. Such controllers are suitably applied in various fields, such as for precise manual cursory controls for CRT displays, remote controls for industrial robots, input devices for handwriting apparatus, fading controls for binaural broadcast receivers, and control levers for TV game devices. Conventional joystick controllers are classified into two types, the non-contact type and the contact type. The contact type has a complicated structure for detecting rotary angles of the control lever. Furthermore, it is difficult to achieve smooth lever handling with contact type controllers, and controller reliability is limited by the short-life characteristic of contact mechanisms such as slidable resistors. To overcome such defects the non-contact type transducer using magnetic fields has been developed to the level of practical use.

U.S. Pat. No. 3,331,972 (Moeller) discloses a magnetic control stick system wherein a Belleville type spring 16 is inserted between a fixed housing member and a ring 14 pressed by the spring against a rotor 11. Thus, the spring force urges the components apart which is a hindrance during the assembly.

OBJECTS OF THE INVENTION

In view of the above it is the aim of the invention to achieve the following objects singly or in combination:

to provide a non-contact type joystick controller with high resolution and low error over wide inclination angles of the control lever, for example up to ±90°;

to reduce and substantially eliminate the effect of external and undesired magnetic fields on the performance of non-contact type joystick controllers;

to provide for arrangement of joystick controller components in space amenable to accurate placement under production conditions without any spring force components which heretofore tended to urge components apart; and to provide a joystick controller with a broad operational range which affords an appropriate response and "good feel" to the operator throughout the operational range.

SUMMARY OF THE INVENTION

The joystick controller of the present invention is characterized by a pair of magnetosensitive elements with bias magnets. Each magnetosensitive element is disposed within the magnetic field generated by a permanent magnet fixed relative to the rotor sphere and control lever. Each magnetosensitive plane of the respective magnetosensitive elements is defined and arranged in the same plane, and each magnetosensitive basic direction of the respective elements is set at right angles to each other. Further, bias magnetic fields are arranged and oriented in the same direction as the respective magnetosensitive basic direction. The bias fields are generated by respective bias magnets and are constantly applied to the respective magnetosensitive elements. The output of each magnetosensitive element changes with the variations in the resultant magnetic field of the constant biasing magnetic field of the added bias magnet and the variable magnetic field of the rotary permanent magnet. The angle of the control lever is detected from output components resolved along right angle axes or directions. A sufficiently high level of magnetic force or magnetic field strength for the bias magnetic field can easily be obtained by directly attaching the bias magnet to the magnetosensitive element. Owing to the provision of the bias magnet, and consequent saturation of the magnetosensitive elements, undesired effects of any external magnetic field can be substantially eliminated.

In the assembly arrangement of the rotor and stator members it is another feature of this invention that a spring sheet member is disposed in a spaced gap between the sphere of the rotor member and the surface of the stator member. The spring sheet member permits suitable, controlled friction for movement of the control lever. The sheet member as a spacer is preferably sandwiched around the equator of the sphere of the rotor member and resiliently supports the rotor member on the surface of the stator member.

BRIEF FIGURE DESCRIPTION

In order that the invention may be clearly understood, it will now be described, by way of example, with reference to the accompanying drawings, wherein:

FIG. 1 is a sectional view of a conventional prior art joystick controller;

FIG. 2 is a plan view of the controller of FIG. 1;

FIG. 3 is a plan view of a magnetosensitive element used in the controller of FIG. 1;

FIG. 4 is a simplified coordinate system diagram illustrating the detection of lever angles of the controller of FIG. 2;

FIG. 5 is a cross-sectional view of the main portion of a joystick controller embodiment according to this invention;

FIG. 6 is a plan view of the controller of FIG. 5;

FIG. 7 is a simplified coordinate system diagram illustrating the detection of the lever angle of the controller in FIG. 5;

FIG. 11 is a cross-sectional view of the main portion of the joystick unit in FIG. 10;

FIG. 12 is a plan view of a rotor member in FIG. 11;

FIG. 13 is a cross-sectional view taken along the line A—A of FIG. 12;

FIG. 14 is a plan view of a stator element in FIG. 11;

FIG. 15 is a cross-sectional view taken along line B—B of FIG. 14;

FIG. 16 is a plan view of a resilient rim shaped spring in FIG. 11; and

FIG. 17 is a cross-sectional view taken along the line C—C of FIG. 16.

PRIOR ART STATEMENT

Figure 8:
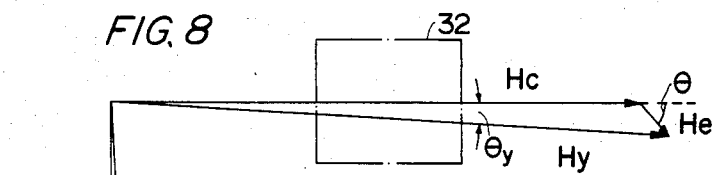
FIG. 8 is a vector diagram further illustrating the mode of detection by the controller of FIG. 5.

Referring first to the prior art, FIGS. 1 to 4 show a typical prior art non-contact type joystick controller which comprises an operational control lever 1, a non-magnetic sphere 2 coupled to the end of the control lever 1, a cylindrical permanent magnet 3 embedded in the sphere 2, and supporter 4 which receives the sphere 2 for free rotation with centering around the center of the sphere 2. The permanent magnet 3 having a magnetic field axis and the control lever 1 are coaxially disposed around a central axis passing through the center of the sphere 2. As shown in FIG. 2, the supporter 4 is provided with a pair of magnetosensitive elements 5, 6 of magnetoresistors MR at the indicated positions. The resistance value of MR 5 and 6 changes according to the direction of the magnetic field axis of permanent magnet 3. Each of the magnetosensitive elements 5 and 6 is formed by a pair of strip or stripe patterns $8a$, $8b$ of a thin ferromagnetic layer of material with magnetoresistive characteristics. The strip patterns $8a$, $8b$ are formed on an insulator board 7 and are disposed at right angles relative to each other.

For operation of each MR, bias voltage Vo is applied between terminals of the series connected strip patterns $8a$, $8b$. A voltage difference V between the bias voltage Vo and the voltage at the central terminal indicated at V in FIG. 3 is obtained as an output of MR. Then the following equation applies:

$$V = k \, Vo \sin 2\theta$$

wherein k is a constant dependent upon the layer materials and $\theta$ is an angle between directions of external magnetic field H and basic direction P along the magnetosensitive plane of the stripe patterns $8a$, $8b$. It is noted that the direction of the basic direction P extends at an angle of 45° relative to the longitudinal directions of the stripe patterns $8a$, $8b$. Furthermore, for the above equation to apply, the strength of the magnetic field H must be selected to be above the saturating magnetic field strength for the MR elements, because the output characteristics of each MR vary with magnetic field strength as well as magnetic field direction.

Each of the magnetosensitive elements 5, 6 is disposed with equal distance in three dimensions relative to the center of the sphere 2, so that each magnetosensitive plane is perpendicular to a radial direction of the sphere 2 and at right angles to each other along X and Y directions. By this configuration, the angle of the control lever 1 is detected by X-Y or right angle dual components as follows.

Referring to FIG. 4, when the Z-axis is introduced at right angles to the X and Y axes respectively, each of the magnetosensitive planes for the magnetosensitive elements 5, 6 becomes parallel to the respective XZ and YZ planes. The magnetic field H of the permanent magnet 3, the orientation of which responds to the changeable position of the control lever 1, is formed at the position having a rotation angle $\theta'$ relative to the X-axis and an inclination angle $\varphi'$ relative to the Z-axis. The projection angles $\theta x$, $\theta y$ of the magnetic field H against respective magnetosensitive elements 5, 6 are therefore indicated as follows.

$$\theta x = \tan^{-1}(\tan \varphi \cos \theta')$$

$$\theta y = \tan^{-1}(\tan \varphi \sin \theta')$$

Thus, each of outputs Vx, Vy of respective divided components of the MR are indicated as follows.

$$Vx = k \, Vo \sin 2\theta x$$

$$Vy = k \, Vo \sin 2\theta y.$$

If $\varphi'$ is assumed small enough, the above equations may be approximated as follows.

$$Vx \approx 2 \, k \, Vo \tan \varphi' \cdot \cos \theta'$$

$$Vy \approx 2 \, k \, Vo \tan \varphi' \cdot \sin \theta'$$

From these approximate equations, the rotation angle $\theta'$ and the inclination angle $\varphi'$ of the control lever 1 may be obtained by the following operational equations.

$$\theta' = \tan^{-1} \frac{Vy}{Vx} \qquad (1)$$

$$\varphi' = \tan^{-1} \sqrt{\frac{Vx^2 + Vy^2}{2 \, k \, Vo}} \qquad (2)$$

However, the joystick controller based on the above principle has the following problems. First, these equations (1), (2) apply only to the limited case of small inclination angle $\varphi'$ and errors increase disproportionately with an increasing inclination angle $\varphi'$. For instance, when $\varphi'$ is about 15°, the error angle between $\varphi'$ and $\theta'$ is about 1°. However, if $\varphi'$ is further increased, the increase of the error angle accelerates steeply. Second, in case another external magnetic field different from that of the permanent magnet 3, is applied to the elements, output is produced due both to the magnetic field of the permanent magnet 3 and the other undesired external magnetic source. At this time, if the desired magnetic field of the permanent magnet is made sufficiently large enough in comparison with the undesired external magnetic field, the effect of the undesired external magnetic field may be reduced, but there exist certain structural limitations. The third problem equally important from the perspective of this invention is that a three-dimensional arrangement of the elements with a right angle relationship among the elements is very difficult. In this respect current methods of mass production of controllers are unsatisfactory.

In addition, it is preferred that the control levers of joystick controllers have a broad operational range and afford an appropriate response and "good feel" for the operator. The operational range of the control lever in the non-contact type may be widened to near right angles (±90°) for inclined movement by an arrangement projecting the sphere from the supporter. Appropriate "good feel" for lever operation, however, is not easily obtained due to friction between the sphere and the supporter and because of difficulty in the torque adjustment for a suitable friction.

DETAILED DESCRIPTION OF PREFERRED EXAMPLE EMBODIMENTS AND OF THE BEST MODE OF THE INVENTION

In FIGS. 5 and 6, a joystick controller 10 according to the invention comprises a stator member 12 and a rotor member 14 supported by the stator member 12. The rotor member 14 includes a non-magnetic sphere 16, a permanent magnet 18 embedded inside the sphere 16 and an operational control lever 20 integrally connected to the sphere. The stator member 12 includes a supporting block 22 having a spherical seat or surface for receiving the sphere 16 so that the sphere 16 is centered and freely rotatable around its center. The stator member 12 also includes a cover plate 24 for holding the sphere 16 in the spherical seat or surface of the stator member 12 without slipping and an interface circuit wiring 26 integrally assembled on a printed circuit board 28. The center of the sphere 16 is positioned at a given point on the surface of the board 28, and a pair of magnetosensitive elements 30, 32 is disposed in the same plane of the board 28. Each of elements 30, 32 is provided with bias magnets 34, 36 comprising permanent magnets fixed on the adjacent side of the printed circuit board 28 opposite to the respective elements 30, 32. The magnetosensitive elements 30 and 32 on the front side of the board 28 are placed at the same distance from the center of the sphere 16, but oriented in different directions, with the angle 90° between the respective basic directions $P_1$ and $P_2$. The basic direction $P_1$ of the element 30 is so disposed to coincide with the X-axial direction, and the basic direction $P_2$ of the element 32 is so disposed to coincide with the Y-axial direction. Each of the bias magnets 34, 36 disposed near the respective elements 30, 32 is so arranged as to apply bias magnetic fields Hc parallel to the respective basic directions $P_1$, $P_2$ of the respective elements 30, 32. The bias magnetic field Hc of each bias magnet 34, 36 is provided with sufficient magnetic force or field strength for saturation of the elements 30, 32. The bias magnetic field Hc is larger than the magnetic field He of the permanent magnet 18 in the rotor member 14.

From another perspective, the magnitude of the vector sum resultant magnetic fields Hx or Hy shown in FIG. 8 is selected to be above the saturation magnetic field for the magnetosensitive elements. Also, according to the invention He is smaller in magnitude than Hc and the ratio of Hc/He is selected between 5 and 20. The larger ratio affords good linear characteristics for the joystick controller 10.

The principles and method for detecting the lever angle of the joystick controller according to the invention are hereafter described.

As shown in FIG. 7, a pair of the magnetosensitive elements 30, 32 is disposed in common in the X-Y plane. The angle of the control lever 20 along the Z axis is derived from the inclination angle $\varphi$ from the X-Y plane, and the rotation angle $\theta$ from the Y-axis. When each of the parallel components He of the permanent magnet 18 in the magnetic field H is presented to the magnetosensitive plane of the respective elements 30, 32, the relation between H and He is as follows.

$$He = H \cos \varphi \quad (3)$$

On the other hand, the respective biasing magnetic fields Hc are oriented at right angles in the respective directions of the X- and Y- axes so as to coincide with the respective basic direction of the respective elements 30, 32. Therefore, each magnetosensitive plane of the respective elements 30, 32 is affected by the resulting magnitude of either rotational magnetic field Hx or Hy. Each field Hx or Hy is a resultant vector sum of the biasing magnetic field Hc and variable magnetic field He. From the composed or resultant magnetic field Hx (Hy), and the angle $\theta x$ ($\theta y$) formed between Hx and X (Hy and Y)-axes, the following relations are established.

$$\sin \theta x/He = \cos \theta/Hx$$

$$\sin \theta y/He = \sin \theta/Hy$$

By selecting a sufficiently large magnitude biasing magnetic field Hc compared with the variable magnetic field He, approximate equations $Hx \doteq Hc$, $Hy \doteq Hc$ become effective. Therefore, each of the outputs Vx, Vy of the respective elements 30, 32 is indicated as follows.

$$Vx = k \, Vo \sin 2\theta x = 2k \, Vo \sin \theta x \cos \theta x$$
$$\doteq \frac{2k \, Vo \, He}{Hc} \cos \theta$$

$$Vy = k \, Vo \sin 2\theta y = 2k \, Vo \sin \theta y \cos \theta y$$
$$\doteq \frac{2k \, Vo \, He}{Hc} \sin \theta$$

By combining equation (3) with the above equations, the following further equations are derived:

$$Vx \doteq A \cos\varphi \phi \cos \theta \quad (4)$$

$$Vy \doteq A \cos\varphi \phi \sin \theta \quad (5)$$

where A is $2k \, Vo \, H/Hc$ and nearly equals a constant.

Accordingly, the two variable angles of $\varphi$ and $\theta$ are ascertained by using the equations (4) and (5) rearranged in the form of the following operational equations.

$$\varphi = \cos^{-1} \sqrt{\frac{Vx^2 + Vy^2}{A}} \quad (6)$$

$$\theta = \tan^{-1} \frac{Vy}{Vx} \quad (7)$$

In this invention, the inclination angle from the X axis can be detected principally in the range of ±90° by using a sufficiently large bias magnetic field Hc. For instance, for bias magnets at the position adjacent the magnetosensitive elements, bias magnetic fields Hc are selected 5 to 20 magnitudes times the magnetic field He of the rotatable magnet. The bias magnetic field Hc according to the invention, is added to coincide with the basic direction or zero output direction of magnetosensitive elements. As a result, the detection of the angle of the control lever is achieved in the most favorable output range of the elements and the joystick controller offers an excellent performance with linear and high resolution characteristics.

Figure 9:
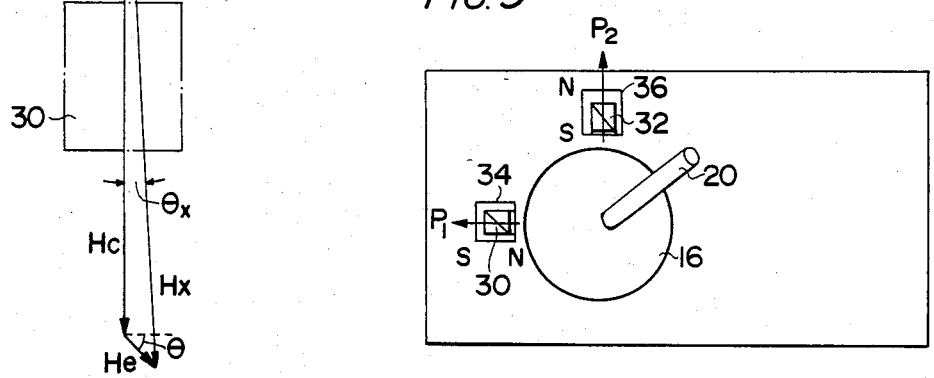
FIG. 9 is a plan view of a main portion of another embodiment of this invention.

This invention is not, of course, limited to the above embodiment, but may be applied to other variations such as the example embodiment shown in FIG. 9. In this example, each of the basic directions $P_1$ and $P_2$ of magnetosensitive elements 30, 32 and each of magnetic field directions of bias magnets 34, 36 coincide with radial axes originating from the center of the rotor member. Further, the bias magnets may be fixed on the magnetosensitive elements in one piece and on one side, or may be disposed on both sides of the elements as modifications of the invention.

Figure 10:
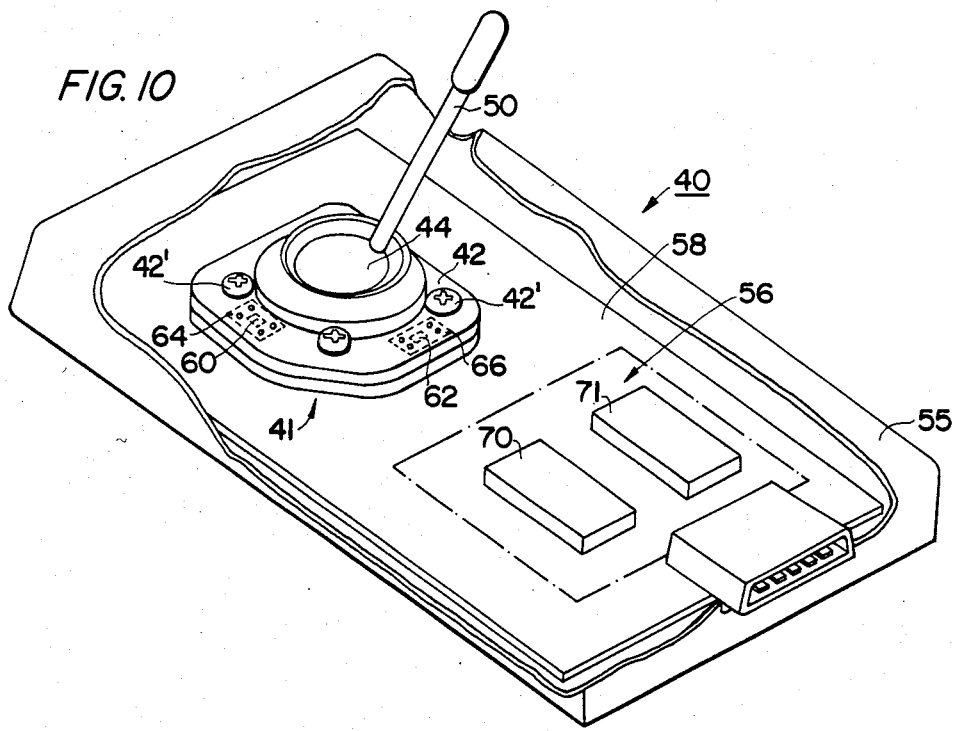
FIG. 10 is a perspective view of a modification of the controller in FIG. 5.

FIG. 10 is a modification of the joystick controller in FIG. 5, wherein a joystick controller 40 comprises a housing case 55, a joystick unit 41, and an interface circuit wiring 56 within the case 55. The unit 41 and wiring 56 are mounted on a single printed circuit board 58. The unit 41 includes a rotor member 44 provided with a control lever 50, a permanent magnet 48 which is integrally moved with the control lever 50, and a stator member 42 having a spherical seat or surface for receiving the rotor member. The stator member 42 is provided with a pair of magnetosensitive elements 60, 62 such as magnetoresistors MR for detecting change of the magnetic direction generated by the permanent magnet 48. Each of the MR elements 60, 62 is connected to a d.c. power source 70 and an operational circuit 71 of the circuit wiring 56 to process detected input signals into desired output signals. The bias magnets 64, 66 are also attached adjacent to respective elements 60, 62.

In FIG. 11, the unit 41 is assembled by contacting a spherical surface of the rotor member 44 with the spherical surface of the stator member 42. The center axis of the control lever 50 is inserted into a hole 72 passing through the center of plastic semispheres 45a, 45b. The lower end of the control lever 50 is provided with locking shoulders 50' having a slightly larger diameter than the hole 72 to provide an interference fit in the hole, whereby the two semispheres 45a and 45b are held together without any further mounting means for forming the rotor member 44.

The cylindrical permanent magnet 48, for example, made of barium ferrite or other full magnetic materials, is located within a cylindrical slot 73 coaxially formed around the hole 72, preferably symmetrically in both semispheres 45a, 45b. It is preferred to form a flat top 45' on the semisphere 45a of the rotor member 44 and a flat bottom 45" on the semisphere 45b of the rotor member 44 for facilitating a pressure insertion of the control lever 50 into the hole 72 of the semispheres 45a, 45b to form said interference or press fit.

The semispheres 45a, 45b, which are fabricated by injection molding of plastic materials, are connected to each other by said press fit to form the non-magnetic part of the rotor member 44. The semispheres 45a, 45b are snapped together after the permanent magnet 48 has been inserted into the slot 73. The spherical surface portions of the semispheres 45a, 45b provide sliding surfaces which cooperate with respective sliding surfaces 74 of the stator member 42 as shown in FIG. 11.

The stator member 42 comprises a pair of plastic stator casing shells 43a, 43b which together form a non-magnetic socket for the rotor member 44. Each stator casing shell 43a, 43b is provided with a plurality of approximately tongue shaped radially inwardly reaching projections or lands forming said sliding surfaces 74 for supporting said rotor member 44 as best seen in FIG. 11. More specifically, each of the casing shells 43a, 43b of the stator member 42 is formed with a larger diameter than that of the rotor member 44 for forming a supporting rim 52, 53, for embracing the rotor member 44. A pair of engaging members in the form of a stud 75 and a hole 76 are used for mating and properly locating the casing shells 43a and 43b relative to each other. In one side of each of the casing shells 43a, 43b, a pair of recesses 77 for receiving MR elements 60, 62 and a groove 78 for receiving a flange portion 82 of a rim shaped spring 80 of resilient metal are formed, as well as a plurality of holes 79 for fasteners such as screws 42', shown in FIG. 10. FIGS. 12 to 15 show respectively pieces of mated plastic semispheres 45a, 45b and casing shells 43a, 43b each of which has a symmetrical structure for easy assembly and fabrication.

Referring to FIGS. 11, 16 and 17, the spring 80 made of a phosphoric copper plate deformable by pressure stamping is additionally assembled between the rotor 44 and stator 42. The spring 80 has a rim type shape including a radially extending flange 82 and a plurality of tongues 84 integrally connected to the flange 82, as shown in FIGS. 16 and 17. Each of the tongues 84 extends simultaneously radially inwardly and at an angle of about 45° away from a plane defined by said flange 82, whereby the spring 80 always surrounds the rotor 44 and the tongues 84 of the spring 80 exert on the rotor 44 forces which are substantially directed toward the center of the rotor 44 at all times without urging the casing shells 43a, 43b apart. Additionally, this specific shape of the spring 80 permits the insertion of the spring 80 into the stator casing shell 43a or into the stator shell 43b with the same effect of providing the desired restraint of the rotor 44 against rotation to assure the intended "feel" for the operator of the control lever 50. These features of the spring 80, namely, that it may be inserted into the stator 42 with the spring tongues 84 pointing upwardly or downwardly and that the spring does not urge the stator casing shells 43a, 43b apart, greatly facilitates the assembly of the components. This is so because the assembly line worker does not have to pay special attention in which direction the tongues 84 are pointing when the spring 80 is inserted and it is also not necessary to press the casing shells 43a, 43b together against the force of the spring 80 when the screws 42' are tightened to secure the casing shells 43a, 43b to each other. The spring 80 has a conical, frustum shape with a rim at its large diameter end and with the tongues 84 extending away from the rim as described above. The rim of the spring 80 is preferably formed as the radially extending flange 82. However, such a flange 82 may not be necessary for properly locating the spring 80 in the spacing 81 between the stator 42 and the rotor 44, especially if the tongues 84 of the spring 80 firmly rest with their small diameter end against the inner surface of the casing shell as shown, for example, at 84' in FIG. 11. In other words, the spring 80 may be held in place around the rotor 44 with the flange 82 in the groove 78, or with the tongue ends 84' resting against the shell, or both of these features may be used as shown in FIG. 11.

Since a space is formed between the faces of the rotor and stator members around the rotor, the spring 80 permits a suitable friction against any rotary motion of the rotor member 44 by the control lever 50 without any force urging the casing shells 43a, 43b apart. Accordingly, self-movement of the control lever 50 due to its own weight is prevented, and a "good feel" response is achieved in this improved joystick controller 40.

According to this invention, the operative range of the angle of the control lever 50 is widened to about ±90° without undesired effects, for example, from other external magnetic fields. The advantages of the present invention are attributable to the use of bias magnetic fields, and due to the special shape of the spring 80 a high reliability and a wide applicability are achieved. Further, arrangements of magnetosensitive elements with bias magnets in the same plane according to the invention enable and facilitate precise setting and assembly of mutually related parts and components on the printed circuit board. Thus, the mass production of joystick controllers is improved at reduced costs.

Although the invention has been described with reference to specific example embodiments, it will be appreciated, that it is intended to cover all modifications and equivalents within the scope of the appended claims.

What is claimed is:

1. A joystick controller having a control handle, comprising a stator casing (42) of non-magnetic material, magnetosensitive elements operatively arranged in said stator casing, rotor means (44) having a central axis and being operatively arranged in said stator casing, said rotor means having two substantially semispherical members (45a, 45b) of non-magnetic material and a permanent magnet (48) operatively mounted in said semispherical members, said stator casing having two casing shells (43a, 43b), each casing shell including inwardly reaching surface means (74) for slidingly supporting said rotor means (44) in said stator casing and for providing a spacing (81) between at least one of said shells (43a, 43b) and said rotor means, and frustum shaped spring means (80) surrounding said rotor means in said spacing, said frustum shaped spring means (80) having tongues (84) extending at such an angle relative to a plane dividing said stator casing and toward said central axis, that said spring tongues (84) exert on said rotor means forces which are directed substantially toward the center of said rotor means for providing a certain resistance of said rotor means against rotation of the rotor means without any force components tending to separate said casing shells.

2. The joystick controller of claim 1, wherein said frustum shaped spring means have a radially outwardly extending flange (82), at least one of said casing shells having a radially inwardly open groove (78) for receiving said flange (82) to hold said spring means in place around said rotor means.

3. The joystick controller of claim 1, wherein said tongues of said frustum shaped spring means have a free end resting against an inner surface (84') of one of said casing shells for holding said spring means in place around said rotor means.

4. The joystick controller of claim 1, wherein said inwardly reaching surface means (74) of said stator casing shells comprise a plurality of radially inwardly reaching projections contacting said rotor means at spaced intervals, said spring means being located inside said projections.

5. The joystick controller of claim 1, wherein said rotor means comprise a bore (72) extending coaxially with said central axis, said bore having a given diameter, said control handle having a plurality of locking shoulders (50') having a diameter slightly larger than said given bore diameter for an interference fit of said locking shoulders in said bore.

6. The joystick controller of claim 5, wherein said rotor means comprise a flattened top and a flattened bottom, said bore extending between said flattened top and bottom for inserting said control handle into said bore with a press fit when said rotor means rests on said flat bottom.

7. The joystick controller of claim 5, wherein said central bore extends through said two substantially semispherical members of said rotor means, whereby said interference fit is holding said semispherical members together.

* * * * *